(12) United States Patent
Morris et al.

(10) Patent No.: US 11,619,933 B2
(45) Date of Patent: Apr. 4, 2023

(54) AUTOMATIC PERIODIC ADJUSTMENT OF EQUIPMENT PARAMETERS TO MAXIMIZE EQUIPMENT LIFETIME

(71) Applicant: KCF TECHNOLOGIES, INC., State College, PA (US)

(72) Inventors: Montana Morris, Pittsburgh, PA (US); Tucker Britton, Fort Worth, TX (US)

(73) Assignee: KCF TECHNOLOGIES, INC., State College, PA (US)

( * ) Notice: Subject to any disclaimer, the term of this patent is extended or adjusted under 35 U.S.C. 154(b) by 0 days.

(21) Appl. No.: 17/306,727

(22) Filed: May 3, 2021

(65) Prior Publication Data

US 2022/0350324 A1 Nov. 3, 2022

(51) Int. Cl.
*G05B 23/02* (2006.01)

(52) U.S. Cl.
CPC ....... *G05B 23/0283* (2013.01); *G05B 23/024* (2013.01); *G05B 23/0235* (2013.01); *G05B 23/0272* (2013.01)

(58) Field of Classification Search
CPC ............ G05B 23/0283; G05B 23/0235; G05B 23/024; G05B 23/0272
USPC ......................................................... 702/184
See application file for complete search history.

(56) References Cited

U.S. PATENT DOCUMENTS

| | | | |
|---|---|---|---|
| 2009/0037206 A1* | 2/2009 | Byrne | G06Q 10/20 705/28 |
| 2015/0149134 A1* | 5/2015 | Mehta | G06F 30/20 703/6 |
| 2019/0187679 A1* | 6/2019 | Strudwicke | G05B 23/0272 |

FOREIGN PATENT DOCUMENTS

EP  2837984 A2 * 2/2015 ......... G05B 23/0283

* cited by examiner

*Primary Examiner* — Lee E Rodak
*Assistant Examiner* — Byung Ro Lee
(74) *Attorney, Agent, or Firm* — MH2 Technology Law Group LLP

(57) ABSTRACT

Parameter settings and operational data are received from machines for a current predefined time interval. For each machine, a corresponding health metric value is calculated based on the received operational data and machine health data, and stored in association with the received corresponding parameter settings. Associated unknown health metric values are estimated for machines associated with combinations of parameter settings different from the received parameter settings having at least one of the combinations of parameter settings with an associated previously determined health metric value, and at least one other of the combinations of parameter settings with the associated unknown health metric value, based on the corresponding calculated health metric value and the corresponding previously determined health metric value. Associated parameter settings for at least one healthiest machine and at least one least healthy machine are determined based on the stored health metric values and are automatically adjusted.

20 Claims, 6 Drawing Sheets

| Machine ID | Parameter 1 | Parameter 2 | Health Metric |
|---|---|---|---|
| 1 | 1 | 10 | ? |
| 1 | 2 | 10 | ? |
| 1 | 3 | 10 | 7 |
| 1 | 4 | 10 | ? |
| 1 | 5 | 10 | 9 |
| 1 | 1 | 20 | 12 |
| ... | ... | ... | ... |
| 2 | 1 | 10 | 12 |
| 2 | 2 | 10 | ? |
| 2 | 3 | 10 | 8 |
| 2 | 4 | 10 | ? |
| 2 | 5 | 10 | ? |
| 2 | 1 | 20 | 14 |
| 2 | 1 | 30 | 17 |
| 2 | 1 | 40 | 23 |
| ... | ... | ... | ... |
| 20 | 5 | 100 | 41 |

AUTOMATIC PERIODIC ADJUSTMENT OF EQUIPMENT PARAMETERS TO MAXIMIZE EQUIPMENT LIFETIME

This application is related to U.S. patent application Ser. No. 17/106,819 filed on Nov. 30, 2020 and entitled "Optimization for Anomaly Detection", which is hereby incorporated by reference in its entirety.

TECHNICAL FIELD

This disclosure relates to monitoring of operational states, parameter settings, and known faults of a group of machines at a single site to determine and automatically change parameter settings of at least some of the machines to maximize an amount of remaining useful equipment life of the group of machines.

BACKGROUND

Machines, including but not limited to pumps as well as other types of machines, may have a number of parameter settings that could affect a remaining useful equipment life of the machines. In addition, some of the machines may have experienced one or more faults that could indicate an impending failure of a machine component or an impending failure of the machine itself. Other factors that may affect and/or provide an indication of remaining useful equipment life of a machine may include its operating environment, operational data, and machine health data. Operating environment data may include temperature and humidity as well as other factors. Operational data may include, but not be limited to, acceleration and/or deceleration of one or more components, as well as other operational data. Machine health data may include, but not be limited to, number of hours of operation per machine, number of hours of service per component, equipment maintenance records, etc.

Machine and component parts may be costly to replace, and failures negatively affect production while a machine is placed out of service until an ordered replacement machine or component is delivered and installed. In some instances, a remaining useful equipment life of the machines could be extended if one or more of the machine parameter settings were adjusted. However, it may be difficult to determine how to adjust the machine parameter settings.

SUMMARY

According to some embodiments, a machine-implemented method is provided for automatically performing periodic adjustment of machine parameters to maximize machine lifetime. For each predefined time interval, at least one computing device receives data from multiple machines. The data includes corresponding parameter settings and corresponding operational data for a current predefined time interval. A corresponding health metric value is calculated for each of the machines with its parameter settings based on the corresponding operational data received during the current predefined time interval and corresponding machine health data. The calculated corresponding health metric value is stored for each of the machines in association with the received corresponding parameter settings. For each of the machines associated with combinations of parameter settings different from the received parameter settings, wherein at least one of the combinations of parameter settings different from the received parameter settings has an associated previously determined health metric value, and at least one other of the combinations of parameter settings different from the received parameter settings has an associated unknown health metric value, the associated unknown health metric value is estimated based on the corresponding calculated health metric value and the corresponding previously determined health metric value. The corresponding estimated unknown health metric value is stored as the corresponding health metric value for each of the associated machines. At least one healthiest machine and at least one least healthy machine are determined for the current predefined time interval based on the corresponding stored health metric values. Based on the stored health metric values, new values for the parameter settings for the at least one healthiest machine and the at least one least healthy machine are determined. The parameter settings are automatically adjusted to the determined new values for the at least one healthiest machine and the at least one least healthy machine.

According to some embodiments, a system is provided for performing automatic adjustment of machine parameters to maximize machine lifetime. The system includes at least one processor and at least one memory connected to the at least one processor. When the at least one processor executes instructions stored in the at least one memory, the at least one processor performs operations. According to the operations, for each predefined time interval, data is received from multiple machines. The data includes corresponding parameter settings and corresponding operational data for a current predefined time interval. A corresponding health metric value is calculated for each of the machines, with its corresponding parameter settings, based on the corresponding operational data received during the current predefined time interval and corresponding machine health data. The corresponding health metric value is stored for each of the machines in association with the corresponding received parameter settings. For each of the plurality of machines associated with combinations of parameter settings different from the received parameter settings, wherein at least one of the combinations of parameter settings different from the received parameter settings has an associated previously determined health metric value, and at least one other of the combinations of parameter settings different from the received parameter settings has an associated unknown health metric value, the associated unknown health metric value is estimated based on the corresponding calculated health metric value and the corresponding previously determined health metric value. The corresponding estimated unknown health metric value is stored as the corresponding health metric value for each of the machines associated with the corresponding estimated unknown health metric value. At least one healthiest machine and at least one least healthy machine are determined for the current predefined time interval based on the corresponding stored health metric values. Based on the stored health metric values, new values for the parameter settings are determined for the at least one healthiest machine and the at least one least healthy machine. The parameter settings are automatically adjusted to the determined new values for the at least one healthiest machine and the at least one least healthy machine.

According to some embodiments, a non-transitory computer-readable storage medium is provided that has instructions stored therein. When at least one processor reads and executes the instructions, the at least one processor performs operations. According to the operations, the at least one processor receives data from machines during each predefined time interval. The data includes corresponding parameter settings and corresponding operational data. A corresponding health metric value is calculated for each of the machines with the corresponding parameter settings based on the corresponding operational data received during a current predefined time interval and corresponding machine health data. The corresponding health metric value is stored in association with the corresponding received parameter settings for each of the machines. For each of the machines associated with combinations of parameter settings different from the received parameter settings, wherein at least one of the combinations of parameter settings different from the received parameter settings has an associated previously determined health metric value, and at least one other of the combinations of parameter settings different from the received parameter settings has an associated unknown health metric value, the associated unknown health metric value is estimated based on the corresponding calculated health metric value and the corresponding previously determined health metric value. The corresponding estimated unknown health metric value is stored as the corresponding health metric value for each of the machines associated with the corresponding estimated unknown health metric value. At least one healthiest machine and at least one least healthy machine are determined for the current predefined time interval based on the corresponding stored health metric values. Based on the stored health metric values, new values for the parameter settings for the at least one healthiest machine and the at least one least healthy machine are determined. The parameter settings are automatically adjusted to the determined new values for the at least one healthiest machine and the at least one least healthy machine.

BRIEF DESCRIPTION OF THE DRAWINGS

Generally, like reference numerals in the various figures are utilized to designate like components.

FIG. 5 shows an example table that stored parameter settings and health metric values for the machines, according to some embodiments.

DETAILED DESCRIPTION

Figure 1:
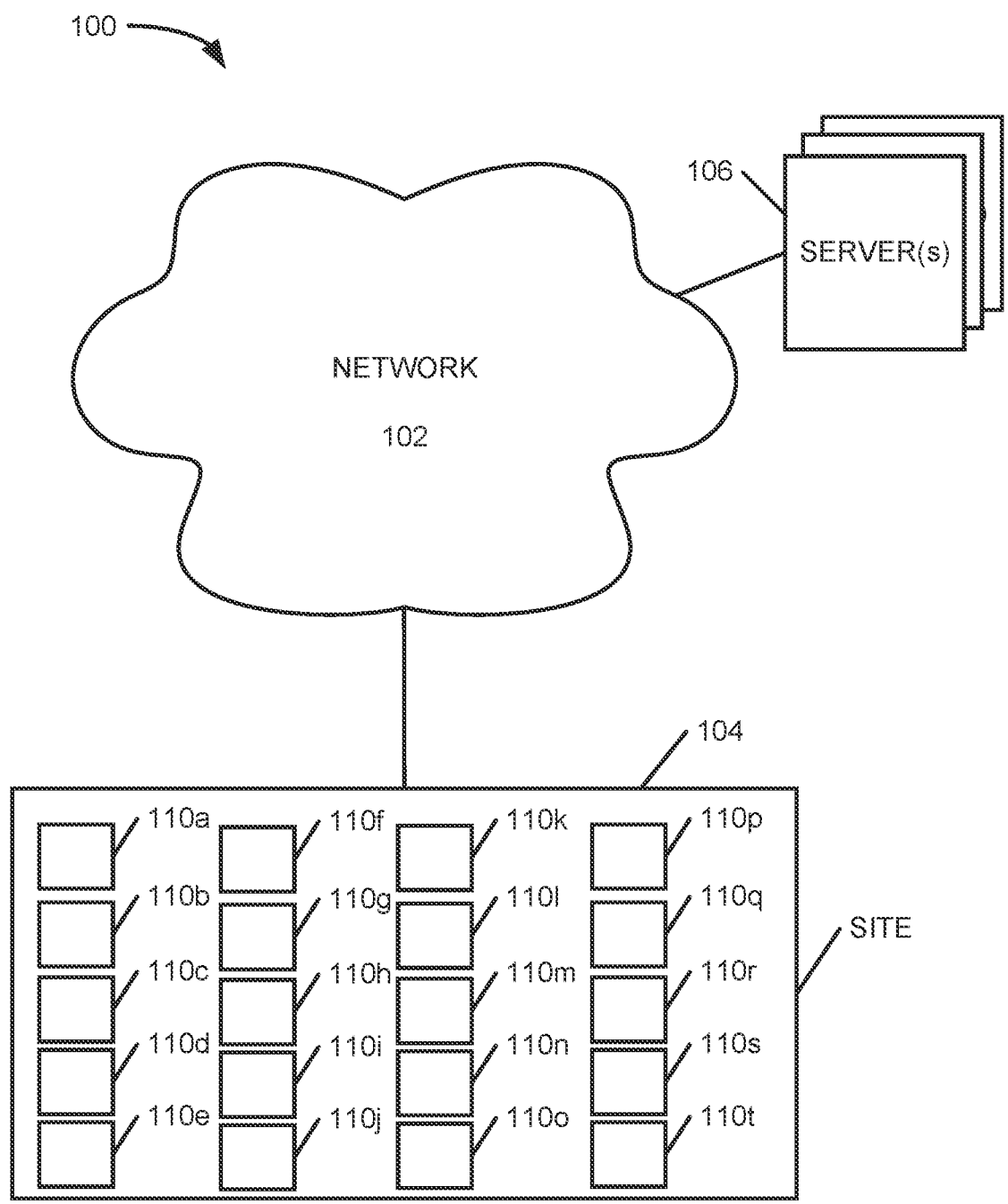
FIG. 1 illustrates an example environment in which embodiments may operate.

FIG. 1 illustrates an example environment 100 in which various embodiments may operate. Environment 100 may include a network 102, multiple machines 110a-110t located at a site 104, and at least one server 106.

Network 102 may be a wired or wireless network and may be implemented by any number of suitable communication media such as, for example, a packet-switched data network (PSDN), a radio frequency network, a satellite communication network, a network of networks such as the Internet, a company intranet, other types of networks, or a combination of various types of networks.

Each of machines 110a-110t may include one or more sensors for monitoring operational conditions that may be periodically reported to server 106. Each of the machines 110a-110t may have a wired or wireless connection with server 106 via network 102. The wireless connection may be via a Wireless Fidelity (WiFi) connection, a Bluetooth® (Bluetooth is a registered trademark of Bluetooth Sig, Inc., a Delaware corporation) connection, or another type of wireless connection to network 102. In some embodiments, machines 110a-110t may be connected to network 102 via a wireless or a wired connection. In at least some embodiments, each of the machines may include, but not be limited to a pump, and the one or more sensors may include, but not be limited to an accelerometer or other type of sensor. In some embodiments, the one or more sensors may be one or more Internet of Things (IoT) devices.

The one or more sensors may periodically provide current operational data such as, for example, acceleration of a component, temperature, humidity, a vibration metric, or other operational data to respective machines 110a-110t for reporting to server 106. In some embodiments, a logistic controller (not shown) of each of the respective machines 110a-110t may periodically provide operational data such as, for example, revolutions per minute (RPM) and/or other operational data regarding the respective machines 110a-110t for those respective machines 110a-110t to report to server 106 via network 102.

Server 106 may include multiple servers such as, for example, a server farm. In some embodiments, server 106 may include multiple servers in a hub and spoke configuration.

Each of machines 110a-110t may provide the monitored operational data to server 106 during each of a number of predefined time intervals.

Although FIG. 1 shows twenty machines 110a-110t being located at site 104, site 104 may include more than twenty machines or fewer than twenty machines in other embodiments. Additionally, server 106 may be connected to machines on one site 104 or at a plurality of sites.

Figure 2:
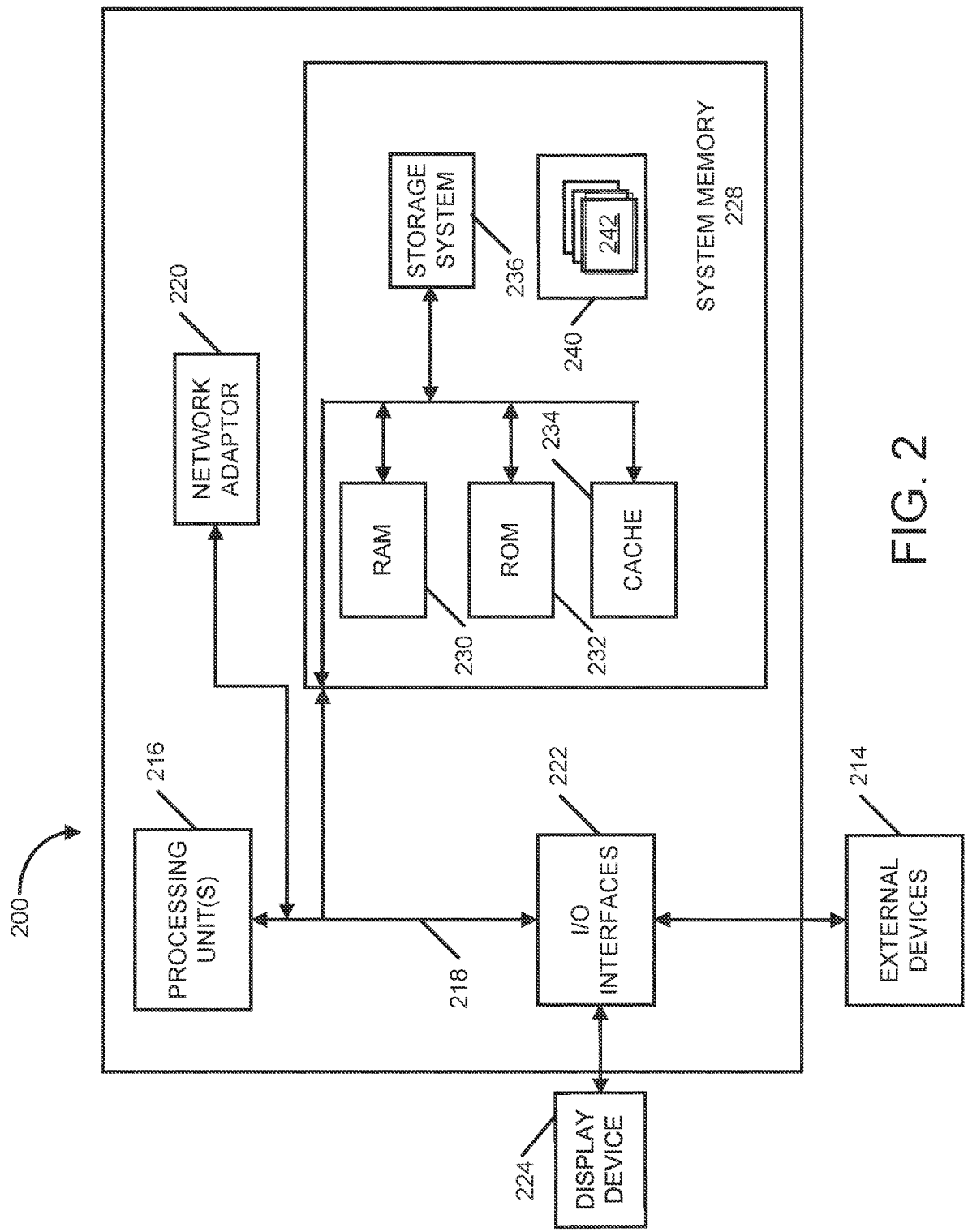
FIG. 2 is a functional block diagram of an example computing system for implementing various embodiments.

FIG. 2 illustrates an example computing system 200 that may implement server 106 and/or may be included in machines 110a-110t. Computing system 200 is shown in a form of a general-purpose computing device. Components of computing system 200 may include, but are not limited to, one or more processing units 216, a system memory 228, and a bus 218 that couples various system components including system memory 228 to one or more processing units 216.

Bus 218 represents any one or more of several bus structure types, including a memory bus or memory controller, a peripheral bus, an accelerated graphics port, and a processor or local bus using any of a variety of bus architectures. Such architectures may include, but not be limited to, Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computing system 200 may include various computer system readable media, which may be any available non-transitory media accessible by computing system 200. The computer system readable media may include volatile and non-volatile media as well as removable and non-removable media.

System memory 228 may include non-transitory volatile memory, such as random access memory (RAM) 230 and cache memory 234. System memory 228 also may include non-transitory non-volatile memory including, but not limited to, read-only memory (ROM) 232 and storage system 236. Storage system 236 may be provided for reading from and writing to a non-removable, non-volatile magnetic medium, which may include a hard drive or a Secure Digital (SD) card. In addition, a magnetic disk drive, not shown, may be provided for reading from and writing to a removable, non-volatile magnetic disk such as, for example, a floppy disk, and an optical disk drive for reading from or writing to a removable non-volatile optical disk such as a CD-ROM, DVD-ROM or other optical media. Each memory device may be connected to bus 218 by at least one data media interface. System memory 228 further may include instructions for processing unit(s) 216 to configure computing system 200 to perform functions of embodiments of the invention. For example, system memory 228 also may include, but not be limited to, processor instructions for an operating system, at least one application program, other program modules, program data, and an implementation of a networking environment.

Computing system 200 may communicate with one or more external devices 214 including, but not limited to, one or more displays, a keyboard, a pointing device, a speaker, at least one device that enables a user to interact with computing system 200, and any devices including, but not limited to, a network card, modem, etc. that enable computing system 200 to communicate with one or more other computing devices. The communication can occur via Input/Output (I/O) interfaces 222. Computing system 200 can communicate with one or more networks including, but not limited to, a local area network (LAN), a general wide area network (WAN), a packet-switched data network (PSDN) and/or a public network such as, for example, the Internet, via network adapter 220. As depicted, network adapter 220 communicates with the other components of computer system 200 via bus 218.

It should be understood that, although not shown, other hardware and/or software components could be used in conjunction with computer system 200. Examples, include, but are not limited to, microcode, device drivers, redundant processing units, external disk drive arrays, RAID systems, tape drives, and data archival storage systems, etc.

Figure 3:
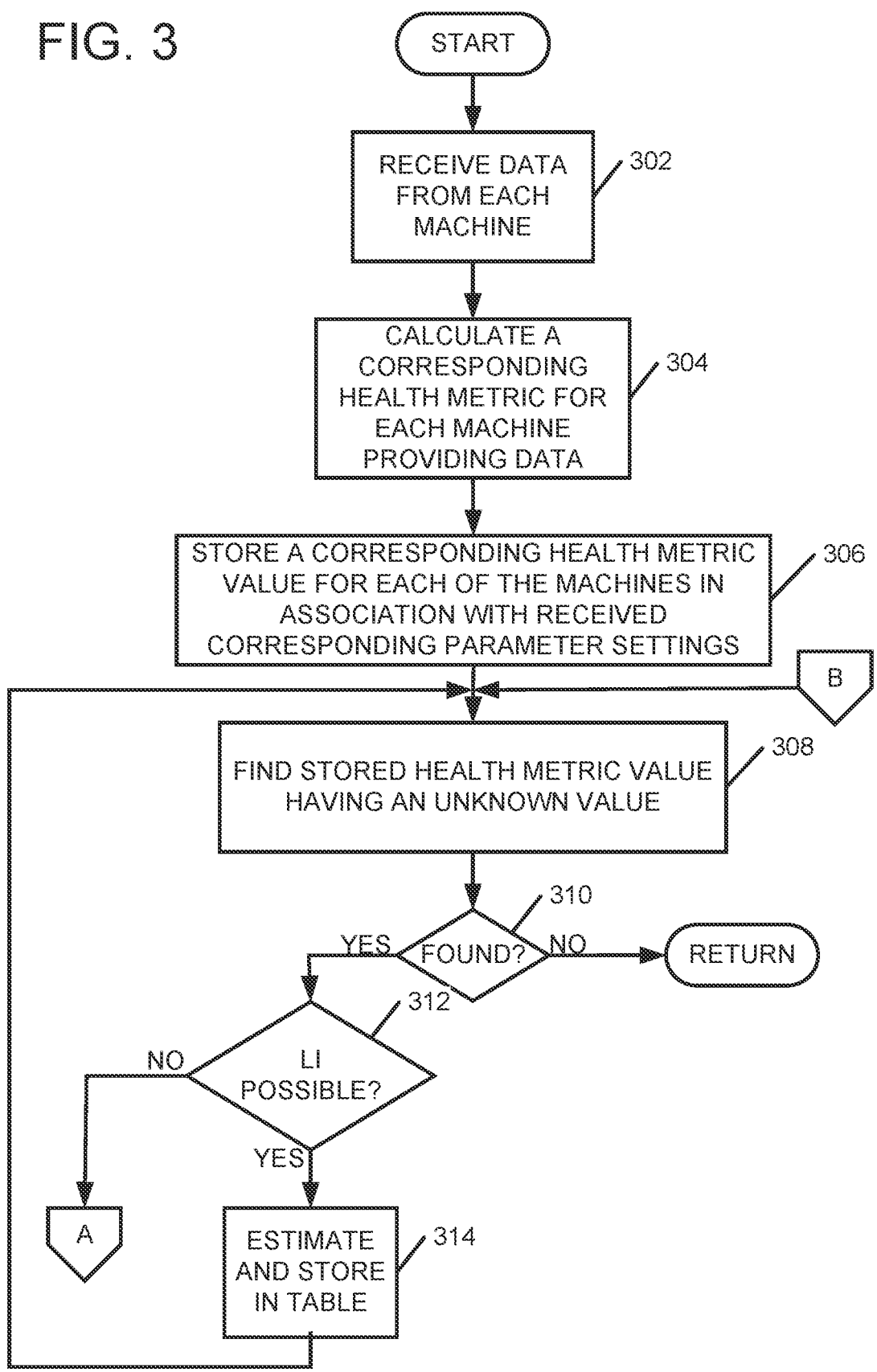
FIGS. 3-4 are flowcharts of an example process for receiving data from machines, calculating and storing health metric values based on the received data, estimating health metric values for machines that have unknown health metric values, and storing the corresponding estimated health metric values according to some embodiments.
Figure 4:
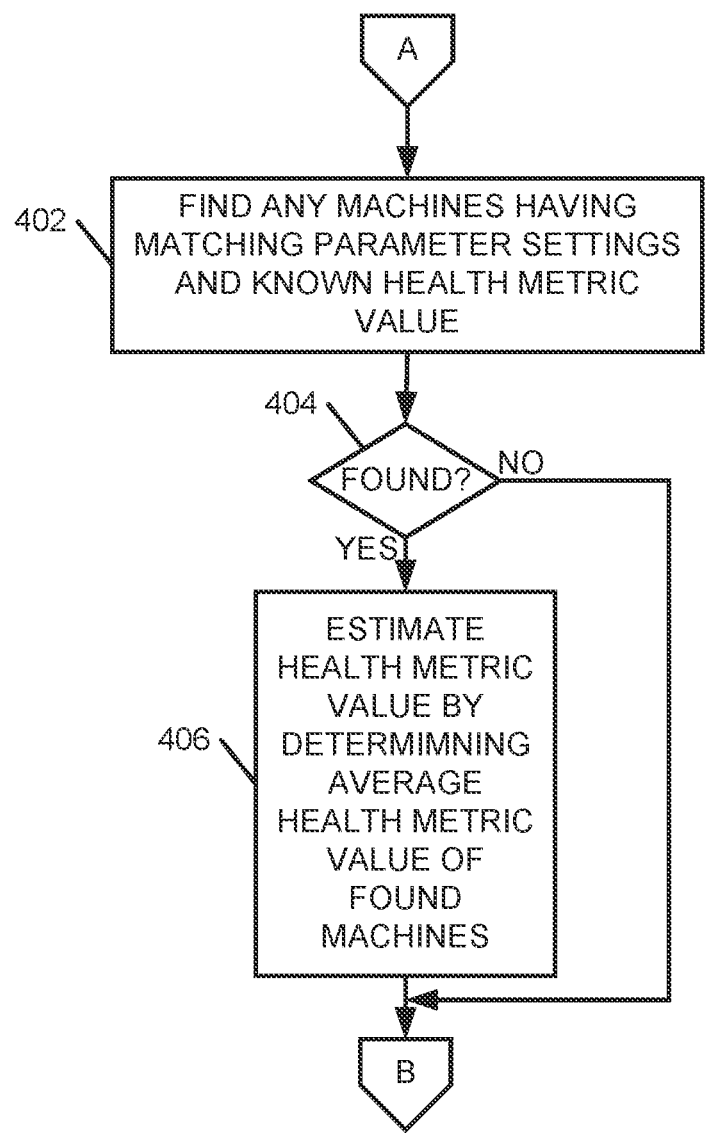

FIGS. 3 and 4 are flowcharts that illustrates a process that may be performed by server 106 for each predefined time interval in various embodiments. During each respective predefined time interval, server 106 may receive data, including operational data, from each of machines 110a-110t (act 302). The operational data for each of the machines 110a-110t may include, but not be limited to, acceleration of a component, temperature, humidity, a vibration metric, parameter settings, number of hours of operation, or other operational data. The received data also may include an identifier that indicates which machine is reporting the received data.

Server 106 then may calculate a corresponding health metric for each of the machines 110a-110t that provide data to server 106 during a current predefined time interval (act 304). In some embodiments, server 106 may access one or more databases to obtain additional information for calculating the corresponding health metric. For example, server 106 may access the one or more databases to obtain information including, but not limited to, number of hours of service per component, equipment maintenance records, number of anomalies detected, a number and type of known faults, as well as other information. A formula for determining a value of a health metric based on the received and accessed data for a respective machine will vary depending on a type of machine, materials used to create component parts, movement of the component parts against other component parts during use, pressures or weights applied to the component parts during use, existing wear and tear of the component parts, performed maintenance, etc. In some embodiments, a value of the calculated health metric may provide an indication of a level of health and an amount of remaining useful equipment life of a machine. For example, in some embodiments if a first machine has a higher health metric value than a second machine, then the first machine may be considered as being healthier than the second machine and may have more remaining equipment life than that of the second machine. In other embodiments, if a first machine has a lower health metric value than a second machine, then the first machine may be considered to be healthier than the second machine and may have more remaining equipment life than that of the second machine.

Server 106 then may store, for each of the machines 110a-110t that provide data to server 106 during the current predefined time interval, a corresponding health metric value in association with received corresponding parameter settings (act 306). In an embodiment, stored data may include a health table that includes a separate row for each machine and an associated combination of parameter settings. For example, if the parameter settings recorded in the health table for each of the machines includes a gear setting and a throttle setting, then the health table may include separate rows for a particular machine for each combination of gear and throttle settings. In some embodiments, the health table my include separate rows for a particular machine for each combination of discrete parameter settings such as, for example, discrete parameter settings of 10, 20, 30, . . . , 90, 100, when the parameter settings may include values, for example, between 1 and 100, inclusive. In the embodiment, each row of the health table further may include an entry for a health metric value for a corresponding machine operating with parameter settings that correspond to the row of the health table. Thus, initially, each row of the health table may have a health metric value indicating an unknown value. For data received from machines 110a-110t during a predefined time interval, server 106 calculates corresponding health metric values and stores the calculated health metric values in corresponding rows of the health table.

In some embodiments, one or more constraints may be placed on the parameter settings to prevent machines from being set to operate with parameter settings that may damage or break a machine, or to prevent performance of machines from dropping below a predefined threshold.

In some embodiments, before processing received data for a current predefined time interval, server 106 may set stored estimated health metric values to indicate an unknown health metric value. If particular machines have not been operating with one or more combinations of parameter settings, then, in this embodiment, rows of the health table corresponding to the particular machines with the one or more combinations of parameter settings may have corresponding health metric values that indicate the health metric value is an unknown value. After server 106 completely updates the health table for each of the machines 110a-110t, server 106 may begin making a pass through the health table looking for rows of the health table that have an unknown health metric value (act 308). If such a row is not found, then the process may be completed.

If, during act 310, server 106 determines that a row of the health table with an unknown health metric value was found, then server 106 may determine whether the health metric value can be estimated based on using linear interpolation (act 312).

In some embodiments, server 106 may determine that linear interpolation is possible if the health table includes two other rows for a same machine that have previously calculated health metric values and differ from the found entry by a same parameter, where the parameter setting of that same parameter of a first of the two other rows is a value that immediately precedes a value corresponding to the same parameter of the found row and the parameter setting of that same parameter of a second of the other two rows is a value that immediately follows the value corresponding to the same parameter of the found row. This can be better explained through an example. FIG. 5 shows an example health table 500 in an embodiment. A fourth row from a top of health table 500 has a health metric of unknown value, as indicated by "?" in FIG. 5. However, the third and fifth rows of health table 500 correspond to the same machine as the fourth row, have known health metric values, and have parameter settings that differ only in a same parameter, parameter 1, where the same parameter of the third row has a value that immediately precedes a value of the same parameter of the fourth row and a value of the same parameter of the fifth row immediately follows the value of the same parameter of the fourth row. Therefore, the health metric value of the fourth row can be estimated by using linear interpolation. Thus, in this example, the health metric value would be estimated to have a value of 8. On the other hand, server 106 would determine that the health metric value of a top row of health table 500 cannot be estimated by using linear interpolation because the health table does not include two other rows for a same machine that have previously determined calculated health metric values that differ from the top row by a same parameter, where the parameter setting of that same parameter of a first of the two other rows is a value that immediately precedes a value corresponding to the same parameter of the found row and the parameter setting of that same parameter of a second of the other two rows is a value that immediately follows the value corresponding to the same parameter of the top row.

In another embodiment, server 106 may determine that linear interpolation is possible if the health table includes two other rows for a same machine that have previously determined calculated health metric values and have parameter settings that differ from the found entry only by a same parameter, where the parameter setting of that same parameter of a first of the two other rows is a value that precedes a value corresponding to the same parameter of the found row and the parameter setting of that same parameter of a second of the other two rows is a value that follows the value corresponding to the same parameter of the found row. This can be better explained through another example. In example health table 500, a fourth row down for a machine with a machine ID of 2 has a health metric of unknown value, as indicated by "?" in FIG. 5. However, a third row down and a sixth row down for the same machine, have known health metric values, and have parameter settings that differ only in the same parameter, parameter 1, where the same parameter of the third row has a value that precedes a value of the same parameter of the fourth row down for machine ID 2 and a value of the same parameter of the fifth row down for machine ID 2 follows the value of the same parameter of the fourth row down. Therefore, the health metric value of the fourth row down can be estimated by using linear interpolation. Thus, in this example, the health metric value would be estimated to have a value of 10.

If, during act 312, server 106 determines that it is possible to use linear interpolation to estimate a health metric value, then server 106 may estimate the health metric value and may store the estimated value for the health metric to replace the unknown health metric value of the found row of the health table.

In some embodiments, estimated health metric values may not be used for linear interpolation purposes. In such embodiments, a corresponding row of the health table that includes an estimated health metric value may indicate that the health metric value is estimated. This may be accomplished in a number of different ways including, but not limited to, storing the estimated health metric value as a corresponding negative value, or setting a flag to indicate whether the health metric value is a calculated value or an estimated value.

If, during act 312, server 106 determines that using linear interpolation to estimate a health metric value is not possible, then server 106 may determine, via the health table, whether any machines that have a known or calculated health metric value have parameter settings that match those that correspond to the found row in the health table (act 402; FIG. 4). If, during act 404, server 106 determines that the health table includes a row having the known or the calculated health metric value and parameter settings that match those that correspond to the found row, then server 106 may estimate a health metric value for the found row by determining an average health metric value for all rows of the health table that have the known or the calculated health metric value and parameter settings that match those of the found row of the health table and setting the health metric value of the found row to the estimated value (act 406). After performing act 406 or after performing act 404 when no row in the health table could be found that has a known health metric value and parameter settings that match those of the found row of the health table, then server 106 may attempt to find a next health table entry or row with an unknown health metric value (act 308; FIG. 3).

Although, in one embodiment, a health table may have rows representing respective machines and each separate combination of parameter settings for the respective machines. Other embodiments may store data for respective machines and each separate combination of parameter settings in columns of a table, with rows of the table representing each of the parameters and a corresponding health metric. Yet other embodiments may store the data for respective machines in a different format.

After performing the process of FIGS. 3 and 4, server 106 then may perform a process to determine new parameter settings for at least one healthiest machine and at least one least healthy machine in order to maximize remaining equipment life for machines 110*a*-110*t*.

Figure 6:
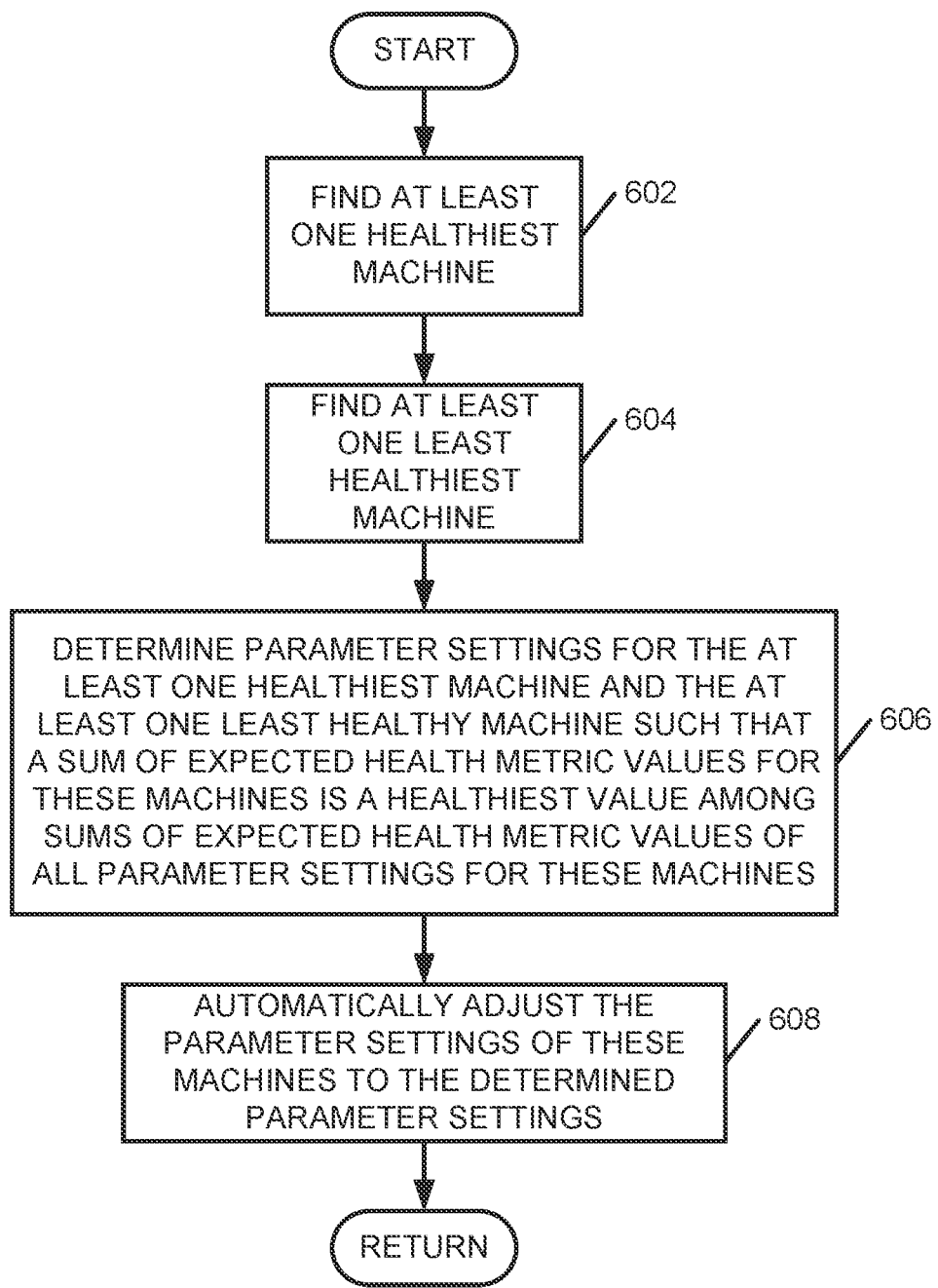
FIG. 6 is a flowchart of an example process for determining new parameter settings for at least one healthiest machine and at least one least health machine and automatically adjusting the parameter settings for the at least one healthiest machine and the at least one least health machine to the new parameter settings, according to some embodiments.

FIG. 6 is a flowchart of an example process that may be performed in some embodiments for maximizing the remaining equipment life for machines 110*a*-110*t*. Server 106 may determine at least one healthiest machine among a group of machines based on stored data for respective machines and associated parameter settings (act 602). In various embodiments, server 106, may determine the at least one healthiest machine based on health metric values calculated for a current predefined time interval. In some embodiments, healthiest machines may be machines having lowest calculated health metrics values among the health metric values calculated for the predefined time interval and least healthy machines may be machines having highest calculated health metric values among the health metric values calculated for the predefined time interval. In other embodiments, healthiest machines may be machines having highest calculated health metrics values among the health metric values calculated for the predefined time interval and least healthy machines may be machines having lowest calculated health metric values among the health metric values calculated for the predefined time interval.

Next, server 106 may determine at least one least healthy machine among the group of machines based on the stored calculated health metric values for the current predefined time interval (act 604).

Based on the stored health metric data, server 106 may determine parameter settings for the at least one healthiest machine and the at least one least healthy machine based on solving $\forall p(\Sigma M_{healthiest} + \Sigma M_{least\ healthy})$=healthiest M, where the $\forall p$ represents all parameter settings, the $\Sigma M_{healthiest}$ represents a sum of most healthy expected health metric values of the at least one healthiest machines from among all parameter settings of those at least one healthiest machines, the $\Sigma M_{least\ healthy}$ represents a sum of healthiest expected health metric values of the at least one least healthy machine from among all parameter settings of the at least one least healthy machine, and the healthiest M represents a most healthy health metric value from among a summation of sums of the healthiest expected metric values for the at least one most healthy machine with the sums of the expected healthiest metric values of the at least one least healthy machine.

Server 106 then may send commands to the at least one healthiest machine to automatically adjust the parameter settings of the at least one healthiest machine such that the sum of the expected health metric values is a healthiest metric value from among sums of expected metric values for the at least one healthiest machine, and may send commands to the at least one least healthy machine to automatically adjust the parameter settings of the at least one least healthy machine such that the sum of the expected metric values is a healthiest metric value from among sums of expected metric values for the at least one least healthy machine (act 608). The process may then be completed for the current predefined time interval.

The various embodiments of the present disclosure maximize machine lifetime by determining parameter settings for one or more healthiest machines and one or more least healthy machines each predefined time interval and automatically adjusting the parameter settings for the one or more healthiest machines and the one or more least healthy machines. As machines report their parameter settings and operational data, corresponding health metrics are calculated and stored in association with parameter settings for each reporting machine. If a machine had not yet reported operational data associated with some parameter settings, a corresponding health metric value associated with the some parameter settings is unknown. By estimating and storing health metric values for unknown health metric values, more health metric values are available from which parameter settings for one or more healthiest machines and one or more least healthy machines may be determined and automatically adjusted, thereby improving parameter settings of the one or more healthiest machines and the one or more least healthy machines for maximizing machine lifetime.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Aspects of the present invention are described herein with reference to flowchart illustrations and/or block diagrams of methods, apparatus (systems), and computer-readable storage devices having instructions stored therein for carrying out functions according to embodiments of the invention. It will be understood that each block of the flowchart illustrations and/or block diagrams, and combinations of blocks in the flowchart illustrations and/or block diagrams, can be implemented by computer readable program instructions. Each block in the flowchart or block diagrams may represent a module, segment, or portion of instructions, which comprises one or more executable instructions for implementing the specified logical function(s). In some alternative implementations, the functions noted in the blocks may occur out of the order noted in the Figs. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer readable program instructions also may be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

The invention claimed is:

1. A machine-implemented method to automatically perform periodic adjustment of machine parameters to maximize machine lifetime, the machine-implemented method comprising:
    performing, by at least one computing device, for each predefined time interval of a plurality of predefined time intervals:
        monitoring, by at least one computing device, operational states, parameter settings, and known faults of a plurality of machines, the monitoring further comprising:
            receiving, by the at least one computing device, data from each of the plurality of machines, the data including corresponding parameter settings and corresponding operational data for a current predefined time interval, the operational data including at least one of acceleration and deceleration of one or more components, and at least two items from a group consisting of temperature, humidity, a vibration metric, and parameter settings,
            obtaining machine health data corresponding to the plurality of machines, the machine health data including at least one of a number of hours of operation per machine and a number of hours of service per component,
            calculating, for the each of the plurality of machines with the corresponding parameter settings, a corresponding health metric value, the calculating being based on the corresponding operational data received during the current predefined time interval and the corresponding machine health data,
            storing, for the plurality of machines, the corresponding calculated health metric value in association with the received corresponding parameter settings,
            estimating an associated unknown health metric value for each of the plurality of machines having combinations of parameter settings different from the received parameter settings, wherein at least one of the combinations of parameter settings different from the received parameter settings has an associated previously determined health metric value, at least one other of the combinations of parameter settings different from the received parameter settings has the associated unknown health metric value, and the estimated associated unknown health metric value is based on the corresponding calculated health metric value and the corresponding previously determined health metric value,
            storing, for the each of the plurality of machines associated with the corresponding estimated unknown health metric value, the corresponding estimated unknown health metric value as the corresponding health metric value,
        determining at least one healthiest machine of the plurality of machines and at least one least healthy machine of the plurality of machines for the current predefined time interval based, at least partially, on the corresponding operational data received for the current predefined time interval and the stored health metric values,
        determining new values for the parameter settings of the at least one healthiest machine and the at least one least healthy machine, based, at least partially, on the stored-health metric values for the at least one healthiest machine and the at least one least healthy machine, and the corresponding parameter settings for the at least one healthiest machine and the at least one least healthy machine; and
    responsive to the monitoring, operating the at least one healthiest machine and the at least one least healthiest machine with the new values for the parameter settings to slow down a transformation to a worn out machine due to wear and tear in order to maximize the machine lifetime of the at least one healthiest machine and the at least one least healthy machine, the slowing down of the transformation including automatically sending first commands to the at least one healthiest machine and second commands to the at least one least healthy machine to adjust the corresponding parameter settings.

2. The machine-implemented method of claim 1, wherein the estimating the associated unknown health metric value further comprises:
    using linear interpolation to estimate the associated unknown health metric value, wherein the at least one of the combinations of parameter settings having the associated previously determined health metric value, the corresponding parameter settings associated with the calculated corresponding health metric value, and the at least one other combination of the parameter settings differ from each other only in a same one of the parameter settings.

3. The machine-implemented method of claim 2, further comprising:
    in response to the at least one computing device determining that the linear interpolation cannot be used to estimate the associated unknown health metric value, performing, by the at least one computing device:
        responsive to determining that stored data includes a calculated health metric value corresponding to a second machine that has parameter settings equal to the parameter settings of the machine having the unknown health metric value:

estimating the associated unknown health metric value by determining an average health metric value for all of the plurality of machines associated with the parameter settings equal to the parameter settings associated with the machine having the associated unknown health metric value.

4. The machine-implemented method of claim 1, wherein the determining the new values for the parameter settings for the at least one healthiest machine and the at least one least healthy machine further comprises:
   determining first parameter settings for the at least one healthiest machine and second parameter settings for the at least one least healthy machine such that a sum of expected health metric values for the at least one healthiest machine with the first parameter settings and the at least one least healthy machine with the second parameter settings has a healthiest value from among a sum of expected health metric values for the at least one healthiest machine and the at least one least healthy machine for the each combination of the parameter settings, wherein:
   the new values for the parameter settings for the at least one healthiest machine are the first parameter settings, and
   the new values for the parameter settings for the at least one least healthy machine are the second parameter settings.

5. The machine-implemented method of claim 1, wherein the each combination of the parameter settings for the each of the plurality of machines conforms to one or more constraints.

6. The machine-implemented method of claim 1, wherein the corresponding machine health data for the plurality of machines includes information regarding a corresponding remaining useful life of the each of the plurality of machines, and known faults.

7. The machine-implemented method of claim 1, wherein the automatically adjusting the parameter settings for the at least one healthiest machine and the at least one least healthy machine further comprises:
   prompting for a confirmation regarding performing of the automatically adjusting of the parameter settings; and
   responsive to receiving the confirmation, performing the automatically adjusting of the parameter settings.

8. A system to automatically perform periodic adjustment of machine parameters to maximize machine lifetime, the system comprising:
   at least one processor; and
   at least one memory connected to the at least one processor, wherein when the at least one processor executes instructions stored in the at least one memory, the at least one processor performs operations comprising:
      performing for each predefined time interval of a plurality of predefined time intervals:
         monitoring operational states, parameter settings, and known faults of a plurality of machines, the monitoring further comprising:
            receiving data from each of the plurality of machines, the data including corresponding parameter settings and corresponding operational data for a current predefined time interval, the operational data including at least one of acceleration and deceleration of one or more components, and at least two items from a group consisting of temperature, humidity, a vibration metric, and parameter settings,
         obtaining machine health data corresponding to the plurality of machines, the machine health data including at least one of a number of hours of operation per machine and a number of hours of service per component,
         calculating a corresponding health metric value for the each of the plurality of machines with the corresponding parameter settings, the calculating being based on the corresponding operational data received during the current predefined time interval and the corresponding machine health data,
         storing, for the plurality of machines, the corresponding calculated health metric value in association with the corresponding received parameter settings,
         estimating an associated unknown health metric value for each of the plurality of machines having combinations of parameter settings different from the received parameter settings, wherein at least one of the combinations of parameter settings different from the received parameter settings has an associated previously determined health metric value, at least one other of the combinations of parameter settings different from the received parameter settings has the associated unknown health metric value, and the estimated associated unknown health metric value is based on the corresponding calculated health metric value and the corresponding previously determined health metric value,
         storing, for the each of the plurality of machines associated with the corresponding estimated unknown health metric value, the corresponding estimated unknown health metric value as the corresponding health metric value,
         determining at least one healthiest machine of the plurality of machines and at least one least healthy machine of the plurality of machines for the current predefined time interval based, at least partially, on the corresponding operational data received for the current predefined time interval and the stored health metric values,
         determining new values for the parameter settings of the at least one healthiest machine and the at least one least healthy machine, based, at least partially, on the stored health metric values for the at least one healthiest machine and the at least one least healthy machine, and the corresponding parameter settings for the at least one healthiest machine and the at least one least healthy machine; and
      responsive to the monitoring, operating the at least one healthiest machine and the at least one least healthiest machine with the new values for the parameter settings to slow down a transformation to a worn out machine due to wear and tear in order to maximize the machine lifetime of the at least one healthiest machine and the at least one least healthy machine, the slowing down of the transformation including automatically sending first commands to the at least one healthiest machine and second commands to the at least one least healthy machine to adjust the corresponding parameter settings.

9. The system of claim 8, wherein the estimating the associated unknown health metric value further comprises:
using linear interpolation to estimate the associated unknown health metric value, wherein the at least one of the combinations of parameter settings having the associated previously determined health metric value, the corresponding parameter settings associated with the calculated corresponding health metric value, and the at least one other combination of the parameter settings differ from each other only in a same one of the parameter settings.

10. The system of claim, 9, wherein the operations further comprise:
in response to determining that the linear interpolation cannot be used to estimate the associated unknown health metric value, performing:
responsive to determining that stored data includes a calculated health metric value corresponding to a second machine that has parameter settings equal to the parameter settings of the machine having the unknown health metric value:
estimating the associated unknown health metric value by determining an average health metric value for all of the plurality of machines associated with the parameter settings equal to the parameter settings associated with the machine having the associated unknown health metric value.

11. The system of claim 8, wherein the determining the new values for the parameter settings for the at least one healthiest machine and the at least one least healthy machine further comprises:
determining first parameter settings for the at least one healthiest machine and second parameter settings for the at least one least healthy machine such that a sum of expected health metric values for the at least one healthiest machine with the first parameter settings and the at least one least healthy machine with the second parameter settings has a healthiest value from among a sum of expected health metric values for the at least one healthiest machine and the at least one least healthy machine for the each combination of the parameter settings, wherein:
the new values for the parameter settings for the at least one healthiest machine are the first parameter settings, and
the new values for the parameter settings for the at least one least healthy machine are the second parameter settings.

12. The system of claim 8, wherein the each combination of the parameter settings for the each of the plurality of machines conforms to one or more constraints.

13. The system of claim 8, wherein the corresponding machine health data for the plurality of machines includes information regarding detected anomalies, a corresponding remaining useful life of the each of the plurality of machines, and known faults.

14. The system of claim 8, wherein the each predefined time interval has a length in a range from four minutes to eight minutes.

15. A non-transitory computer readable storage medium having instructions stored thereon, when the instructions are read and executed by at least one processor, the at least one processor performs operations comprising:

performing for each predefined time interval of a plurality of predefined time intervals:
monitoring operational states, parameter settings, and known faults of a plurality of machines, the monitoring further comprising:
receiving data from each of the plurality of machines, the data including corresponding parameter settings and corresponding operational data for a current predefined time interval, the operational data including at least one of acceleration and deceleration of one or more components, and at least two items from a group consisting of temperature, humidity, a vibration metric, and parameter settings,
obtaining machine health data corresponding to the plurality of machines, the machine health data including at least one of a number of hours of operation per machine and a number of hours of service per component,
calculating a corresponding health metric value for the each of the plurality of machines with the corresponding parameter settings, the calculating being based on the corresponding operational data received during the current predefined time interval, and the corresponding machine health data,
storing, for plurality of machines, the corresponding calculated health metric value in association with the corresponding received parameter settings,
estimating an associated unknown health metric value for each of the plurality of machines having combinations of parameter settings different from the received parameter settings, wherein at least one of the combinations of parameter settings different from the received parameter settings has an associated previously determined health metric value, at least one other of the combinations of parameter settings different from the received parameter settings has the associated unknown health metric value, and the estimated associated unknown health metric value is based on the corresponding calculated health metric value and the corresponding previously determined health metric value,
storing, for the each of the plurality of machines associated with the corresponding estimated unknown health metric value, the corresponding estimated unknown health metric value as the corresponding health metric value,
determining at least one healthiest machine of the plurality of machines and at least one least healthy machine of the plurality of machines for the current predefined time interval based, at least partially, on the corresponding operational data received for the current predefined time interval and the stored health metric values,
determining new values for the parameter settings of the at least one healthiest machine and the at least one least healthy machine, based, at least partially, on the stored health metric values for the at least one healthiest machine and the at least one least healthy machine, and the corresponding parameter settings for the at least one healthiest machine and the at least one least healthy machine; and
responsive to the monitoring, operating the at least one healthiest machine and the at least one least healthiest machine with the new values for the parameter settings to slow down a transformation to a worn out machine due to wear and tear in order to maximize the machine lifetime of the at least one healthiest machine and the at least one least healthy machine, the slowing down of the transformation including automatically sending first commands to the at least one healthiest machine and second commands to the at least one least healthy machine to adjust parameter settings.

16. The non-transitory computer readable storage medium of claim 15, wherein the estimating the associated unknown health metric value further comprises:
using linear interpolation to estimate the associated unknown health metric value, wherein the at least one of the combinations of parameter settings having the associated previously determined health metric value, the corresponding parameter settings associated with the calculated corresponding health metric value, and the at least one other combination of the parameter settings differ from each other only in a same one of the parameter settings.

17. The non-transitory computer readable storage medium of claim 16, wherein the operations further comprise:
in response to determining that the linear interpolation cannot be used to estimate the associated unknown health metric value, performing:
responsive to determining that stored data includes a calculated health metric value corresponding to a second machine that has parameter settings equal to the parameter settings of the machine having the unknown health metric value:
estimating the associated unknown health metric value by determining an average health metric value for all of the plurality of machines associated with the parameter settings equal to the parameter settings associated with the machine having the associated unknown health metric value.

18. The non-transitory computer readable storage medium of claim 15, wherein the determining the new values for the parameter settings for the at least one healthiest machine and the at least one least healthy machine further comprises:
determining first parameter settings for the at least one healthiest machine and second parameter settings for the at least one least healthy machine such that a sum of expected health metric values for the at least one healthiest machine with the first parameter settings and the at least one least healthy machine with the second parameter settings has a healthiest value from among a sum of expected health metric values for the at least one healthiest machine and the at least one least healthy machine for the each combination of the parameter settings, wherein
the new values for the parameter settings for the at least one healthiest machine are the first parameter settings, and
the new values for the parameter settings for the at least one least healthy machine are the second parameter settings.

19. The non-transitory computer readable storage medium of claim 15, wherein the corresponding machine health data for the plurality of machines includes information regarding detected anomalies, known faults, and a corresponding remaining useful life of the each of the plurality of machines.

20. The non-transitory computer readable storage medium of claim 15, wherein the automatically adjusting the parameter settings for the at least one most healthy machine and the at least one least healthy machine is performed only after a confirmation is received confirming that the automatically adjusting is to be performed.

* * * * *